United States Patent [19]

Bolenz et al.

[11] Patent Number: 4,506,162

[45] Date of Patent: Mar. 19, 1985

[54] STARTER FOR AN INTERNAL COMBUSTION ENGINE

[75] Inventors: Klaus Bolenz; Franz Liedl, both of Schwieberdingen, Fed. Rep. of Germany

[73] Assignee: Robert Bosch GmbH, Stuttgart, Fed. Rep. of Germany

[21] Appl. No.: 481,892

[22] Filed: Apr. 4, 1983

[30] Foreign Application Priority Data

May 3, 1982 [DE] Fed. Rep. of Germany ....... 3216448

[51] Int. Cl.³ .................. F02N 15/00; F02N 15/06
[52] U.S. Cl. .................. 290/38 A; 290/38 R; 290/46; 310/90; 74/574
[58] Field of Search ............... 290/38 A, 38 B, 38 C, 290/38 D, 38 E, 38 R, 38, 46, 48; 318/429; 310/229, 270, 271, 90, 89; 74/574; 403/137; 464/180

[56] References Cited

U.S. PATENT DOCUMENTS

| 619,296 | 2/1899 | Forster | 310/90 |
|---|---|---|---|
| 2,501,060 | 3/1950 | Leibing | 74/574 X |
| 2,934,656 | 4/1960 | Seilly | 290/38 A |
| 3,274,836 | 9/1966 | Nash | 74/574 |
| 4,387,315 | 6/1983 | Barthruff et al. | 310/90 |

Primary Examiner—William M. Shoop
Assistant Examiner—Paul Shik Luen Ip
Attorney, Agent, or Firm—Frishauf, Holtz, Goodman & Woodward

[57] ABSTRACT

To permit manufacture of starter components with substantial tolerance, while maintaining the axial play of the armature of the starter within tight tolerances, and permit adjustment of the tolerance of the axial play after assembly of the starter component together, an end face (33) of the shaft (4) projects beyond the respective end bearing, which is retained a housing projecting beyond the bearing by the distance of an adjustment plug (29) slightly smaller than the longest shaft—in the light of tolerances—of the starter. An axial play compensation spacer in form of a washer or disc (FIG. 2—35), a ring (FIG. 3—35a) or a centrally held ball (FIG. 4—35b) is placed between the end face (36) of the plug and the end face (33) of the shaft, the plug being formed with an abutment surface (31) which engages an engagement surface (32) at the outside of the housing adjacent the bearing. The plug is threaded in the direction of rotation, so that, upon once being securely seated, it will remain securely seated, thus maintaining the position of the shaft in axial direction.

13 Claims, 4 Drawing Figures

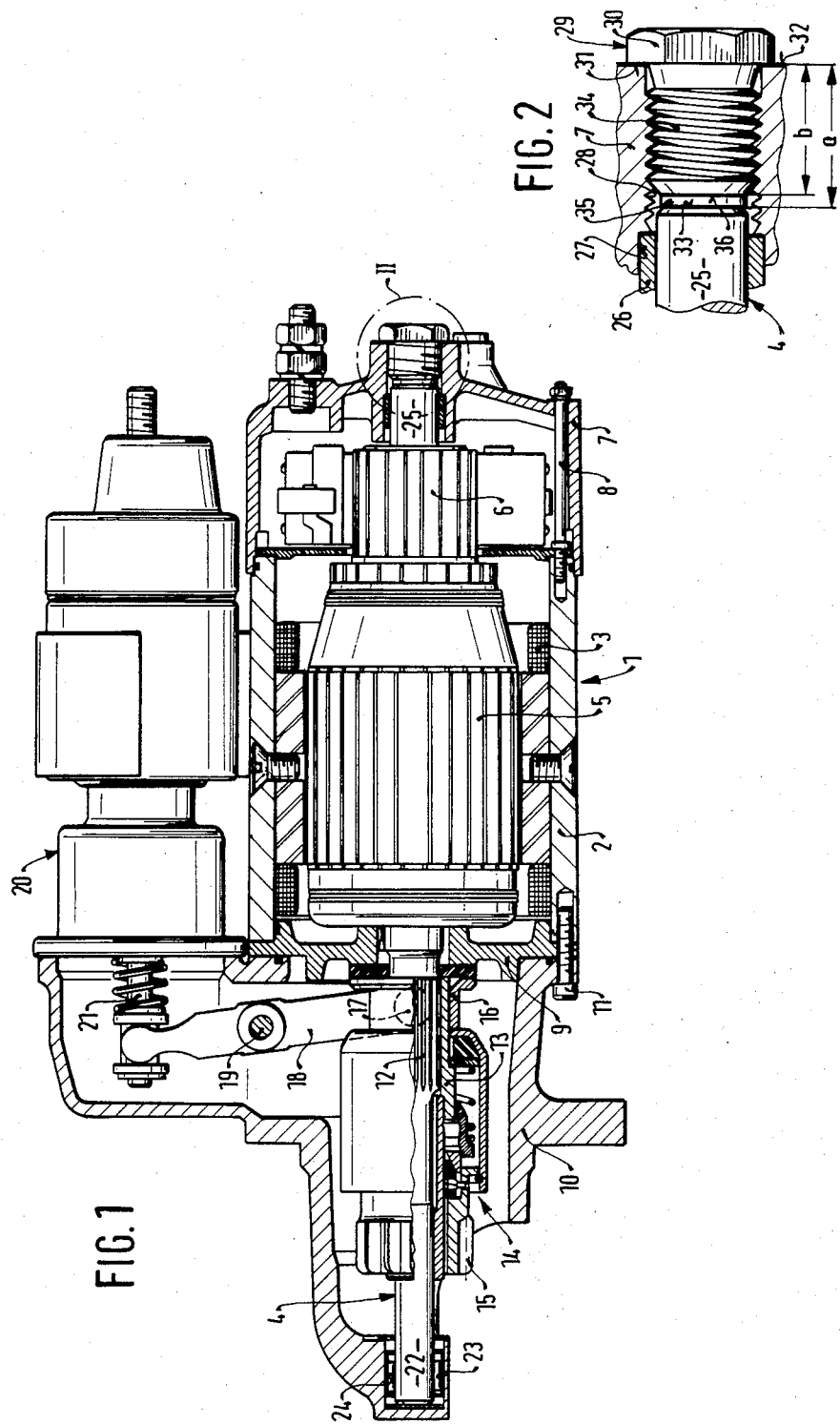

STARTER FOR AN INTERNAL COMBUSTION ENGINE

The present invention relates to a starter for an internal combustion engine, and more particularly to a starter which includes a starter motor shaft positioning structure to positively locate the shaft of the starter motor with respect to the housing thereof in spite of manufacturing tolerances.

BACKGROUND

Starter motors are items of mass production which are not used continuously, but only occasionally, that is, when an internal combustion engine is to be started. Consequently, the production of starter motors is frequently not subject to close tolerance manufacturing processes, since the motor should be inexpensive to make. The operating conditions under which the motor has to function require only highly intermittent duty applications, however, a very high degree of reliability. The usual type of starter motor has a shaft on which an armature is positioned, the windings of which are connected to a commutator. In manufacture, it is frequently difficult to compensate for tolerances of the armature assembly—that is, shaft, armature structure and commutator—and particularly the longitudinal extent of the armature assembly in relation to the frame structure of the starter motor.

It has been proposed to compensate for longitudinal play, or tolerances by compensating for such tolerances upon assembly of the entire starter motor. The commutator bearing is formed with a projecting abutment, extending towards the commutator. The length of all the parts and components which influence axial tolerances is measured, and then a compensating disc is selected, the thickness of which permits only the desired longitudinal excursion of the commutator shaft but no more. This overall length which has to be measured is the distance between the commutator bearing and the motor support bearing opposite the commutator, usually an intermediate bearing, which, in turn, is dependent on the length of the housing of the motor. The length of the housing of the motor is subject to tolerances. Additionally, the distance from the abutment surface or edge on the motor housing to the matching abutment at the inside of the commutator bearing must be determined, considering, additionally, such sealing elements as may be provided, as well as the overall length of the shaft of the starter. Depending on the measured amounts, a compensating or spacer disc or washer is then selected which is placed between the commutator bearing and the end of the drive shaft; after this insertion, the starter is completely assembled together.

The foregoing assembly requires substantial measuring steps which, additionally, must be made on the respective parts to be fitted together. Errors in addition may result, and, further, deformation of individual elements which may occur upon assembly may defeat the compensation as calculated, since the final, assembled motor dimensions may deviate from those which have been measured before assembly.

It has already been proposed to form a tapped opening in the end of the shaft of a starter motor adjacent a commutator bearing, and insert a threaded pin therein, which, then, is threaded out of the shaft to provide the required longitudinal play or clearance of the drive shaft, but no more. It is, of course, difficult to maintain the threaded position of this pin in the drive shaft, particularly since the threaded pin, upon operation of the starter motor, can rub against the stationary end shield of the starter motor. Consequently, the threaded pin must be locked against shifting within the commutator bearing. Such locking means may, for example, be adhesive or locking fluids—for example known under the trademark "Loctite" ®. In order to insure that so-set threaded pins will not move under dynamic conditions, close quality and supervisory control upon insertion is necessary. It has been found that such securing adhesives or securing compounds, while sufficiently stable for indoor operating conditions, are unstable under the widely varying temperature swings to which automotive vehicles are subjected. Consequently, a threaded pin which was thought to be tight, may operate as a floating screw, and cannot be maintained in its position with sufficient reliability against inadvertent repositioning under vibration conditions.

Adhesives can also be used which, however, have the disadvantage that they will set the screw in such a manner that, under repair conditions, they are difficult to remove so that, upon repair of the motor, for example, e.g. upon re-use of the armature in a new starter housing, readjustment of the end pin can become impossible since the pin cannot be released from the threaded opening due to the binding power of the adhesive.

The usual way of holding a pin in position, by a counter or holding nut, requires an additional element, means to hold the shaft; and the pin upon tightening of the counter-nut and, under widely varying temperature conditions, particularly coupled with vibration, does not provide for a reliable positioning of a threaded pin.

THE INVENTION

It is an object to provide a starter motor which is capable of operating under widely varying temperature conditions, and which includes shaft positioning elements maintaining the relative position of the shaft in the housing with a predetermined amount of play—no more and no less.

Briefly, an axial play compensation adjustment plug is provided which has an abutment surface facing an end portion of the bearing housing, and is releasably fitted thereon, for example threaded therein. An engagement surface is formed on the facing side of the bearing housing and is engaged by the abutment surface of the plug. To position the adjacent surfaces, and the plug with respect to the bearing, an axial plate compensation spacer is inserted between the end face of the plug and the facing end of the shaft. The compensation spacer may be a washer, a disc, a ring, or a ball, for example seated in slightly conical depressions formed centrally in the plug as well as in the shaft.

Since the distance of the respective abutment and engagement surfaces of the bearing and the plug will remain, that is, since the plug can be seated tightly against the bearing, the spacer will always maintain the position of the shaft in the housing, and, by selection of spacers of suitable widths in the case of balls of suitable diameter, matching of an armature, and armature shaft to a given housing, regardless of tolerances of manufacture of the shaft and of the housing, becomes economically and readily possible.

The starter in accordance with the invention has the advantage that the adjustment arrangement which is provided to act on one end of the drive shaft, to control the longitudinal play thereof, requires a minimum of parts, and permits adjustment of the axial play of the shaft to smaller tolerances than previously possible, thus improving the resistance of the starter, and of the armature structure thereof, to vibration. The system has the additional advantage that the longitudinal play of the armature, or, more accurately, the armature assembly, can be adjusted after the entire starter has been built. The tolerance of armature excursion, once adjusted and controlled by the appropriate spacer, cannot be changed and will not change during the lifetime of the starter. Yet, if access to the end of the shaft is needed, or if the armature is to be combined in a new housing—or, conversely, another armature is to be inserted into a given housing, repair or replacement of parts and elements is readily possible with simple readjustment and recalibration of the tolerance of the newly assembled parts.

The adjustment element, in accordance with a preferred feature of the invention, is formed as a screw with an enlarged outer head, for example of hexagonal shape for engagement by a socket wrench or the like, so that, upon tightening of the head against a bearing portion which includes the bearing engagement surface, a predetermined position of the bolt with the head is provided, while insuring vibration- and shock-resistant maintainance of the position of the bolt. No additional locking elements usually are needed. The axial play of the armature assembly can be readily determined by suitable selection of the thickness of the spacer element, which can be readily measured since this measurement depends only on two dimensions which will not change upon final assembly. The starter can be completely assembled, with the armature inserted, and the distance of the end of the shaft of the armature assembly to the engagement surface measured by an end gage. Since the length of the plug, with the head is known, the thickness of the spacer element then can readily be determined by calculating the difference between the measured distance from the engagement surface and the length of the plug.

DRAWINGS

FIG. 1 is a longitudinal sectional view through a starter, omitting all components not necessary for an understanding of the invention, or illustrating such components merely in schematic form;

FIG. 2 is a greatly enlarged view of the portion shown in the broken-line circle II of FIG. 1;

DETAILED DESCRIPTION

Figure 3:
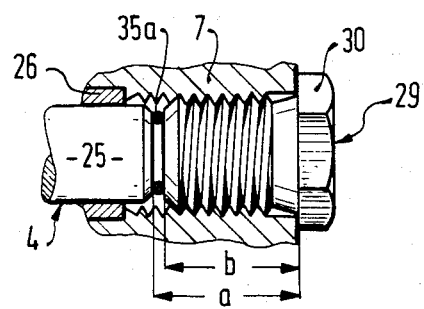
FIG. 3 is a fragmentary view of another embodiment of a spacer element.

The basic construction of the starter is this: a starter motor 1 has a housing 2 in which an exciter winding 3 is located. A shaft 4 of the motor 1 retains an armature 5 and a commutator 6, to form an armature assembly. A commutator bearing 7 is located at the commutator side of the end face of the housing 2, secured therein by bolts 8, of which only one is shown. The other end side of the housing 2 includes an intermediate bearing 9. A bearing housing 10 is connected by bolts 11 to the housing 2. The portion of the shaft 4 which extends into the bearing housing has splined gear teeth 12 which are surrounded by a follower sleeve 13 of an engagement gearing 14. The sleeve 13 is longitudinally moveable with respect to the drive shaft 4, and connected to the drive shaft 4 to rotate therewith. The engagement gearing has a free wheeling arrangement—well-known and standard in the starter construction field, to which the sleeve 13 is coupled by a drive pinion 15. The drive pinion 15 is seated rotatably and longitudinally removable on a smooth portion of the drive shaft 4, axially beyond the gear or tooth or splined portion 12.

An engagement collar 16 of the gearing 14 is coupled to the fork 17 of an engagement lever 18 which is pivotable about a pivot point 19 in the drive bearing housing 10.

A magnetic switch 20 is secured parallel to the motor 1 and attached to the bearing housing 10. The armature rod 21 of an engagement relay—well-known in the art and not further shown—projects into the bearing housing 10. It is coupled to the engagement lever 18. The basic structure is well-known and described, for example, in the chapter "Starting Motors" of various books on automotive elements, for example the "Automotive Handbook" first English edition, published by the Assignee of this application, Robert Bosch GmbH,© 1976.

The drive shaft 4 hs the drive end 22 thereof retained in a bearing 23, for example a ball bearing or roller bearing, which is seated in blind bore or hole 23 of the bearing housing 10. The other end 25 of the drive shaft 4 is retained in a bearing, preferably a ball bearing or roller bearing 26, which is fitted in an opening 27 (FIG. 2) of the commutator bearing housing 7.

In accordance with a feature of the invention, the opening 27 extends through the commutator housing and the outer portion 28 thereof is formed with a thread. A threaded plug 23 is screwed into the threaded portion of the commutator housing 7. The threaded plug is used as part of the longitudinal play or tolerance compensation element of the armature tolerance compensation arrangement. The screw or bolt or plug 29 has an enlarged head 30 having an inner engagement or abutment surface 31 which, when completely and fully screwed into the threaded portion 28, engages with a matching engagement or abutment surface 32 formed on the outside of the commutator housing 7. The surface 32 surrounds the terminal portion of the end portion 28, for example threaded to the end, of the commutator housing 7.

The engagement surface 32 projects by a predetermined distance a beyond the end face 33 of the drive shaft 4, 25 (see FIG. 2). When the plug 29 is completely screwed into the end portion 28 of the bearing housing, and the abutment surface 31 thereof is tight against the surface 32 of the commutator housing 7, the shank portion of the plug will extend into the housing by predetermined distance b. In accordance with a feature of the invention, a spacer element 35 is located between the end face 36 of the plug 29 and the end face 33 of the shaft 4. The thickness of the spacer element 35, together with the permitted longitudinal play or clearance of the drive shaft 4 is then selected in dependence on the measured difference a−b.

In accordance with a feature of the invention shown in FIG. 2, the spacer 35 is in form of a disc, or washer. In accordance with an embodiment of FIG. 3, the spacer is a ring 35a; and in accordance with an embodiment of FIG. 4, the spacer is a ball 35b, seated in conical, or part spherical recesses, shown only schematically, in the end faces 33, 36 of the shaft end portion 22 and the plug 29, respectively.

ASSEMBLY

The entire starter is assembled, in accordance with well-known and standard assembly procedures. After assembly, and when there will be no more changes in dimensions, the distance a is measured. The distance b, of course, is known from the size of the plug 29. A suitably selected spacer 35 is then inserted through the threaded end portion 28 to the facing side 33 of the end portion 25 of the drive shaft 4, and plug 29 is screwed into the tapped opening of the end portion 28 of the bearing housing 7 until the head 30 is snug and tight against the commutator bearing housing, engaging the respective surfaces 31, 32. The end face 36 of the plug then determines the position of the spacer element 35.

Screw or plug 29 is reliably seated within the bearing housing, and undesired loosening thereof can readily be insured against, by so arranging the direction of the thread on the shank 34 of the plug 29, and in the end portion 28 of the housing that, upon rotation of the starter, the screw 29 tends to tighten. Frictional forces, which act from the drive shaft 4 over the spacer 35 on the plug 29 thus will hold the plug 29 tightly each time when the starter is operated.

The spacer 35, upon rotation of drive shaft 4, will rotate at a speed which is less than that of the adjacent portion of the drive shaft 4, but more rapidly with respect to the plug 29 which, of course, is fixed, so that its speed is zero. This relative movement of the spacer 35 decreases wear on the end face 33 of the end portion 25 of drive shaft 4, while likewise decreasing wear on the end face 36 of plug 29, as well as on itself.

Figure 4:
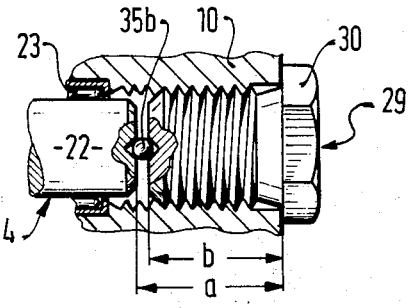
FIG. 4 is a fragmentary view of the end portion of yet another embodiment also showing a ball spacer element.

Forming the spacer as a ball (35b)—see FIG. 4—decreases the friction, and wear-and-tear, and decreases also frictional forces. It is only necessary, then, to form suitable depressions in the end faces 33, 36 of the mutually facing elements formed by the shaft end 25 and the plug 29, to maintain the ball concentrically with respect to the shaft within the facing surfaces 33, 36. A ring-shaped element, for example a spring ring 35a—see FIG. 3—may also be used, with decrease of friction. Lubricant, included in the opening bearing 26, may ooze, or leak into the spacer, likewise decreasing friction.

The armature assembly axial play system can be located at either end of the drive shaft 4. In some installations, the space available for the starter motor at the commutator end is severely limited. Usually, however, slightly more space is available at the drive shaft end. If the system is so modified, the end 25 of the drive shaft 4 is located in a bearing 26 which is fitted into a blind bore within the commutator housing 7, whereas the drive-side bearing 23 is located in a through-bore formed in the drive-side housing 10, in which a plug similar to plug 29, with the requisite spacer 35, 35a, 35b is then inserted. The engagement surface for the head of the longitudinal play adjustment plug is then to be formed at the far end of the drive-side housing 10, for example at the claw-shaped or cantilever-extension thereof. (see FIG. 4) When this arrangement is used, the measurements a and b will be similar to those discussed in connection with FIG. 1; the present invention, thus, provides a highly versatile positioning arrangement for starter shafts, regardless of where the positioning arrangement is to be used.

Various changes and modifications may be made and features described in connection with any one of the embodiments may be used with any of the others, within the scope of the inventive concept.

We claim:
1. Starter structure, for an internal combustion engine having a dynamo electric machine, including
   a stator (3) and a rotor (4,5,6) and housing (2,7,10), said housing having an outside surface;
   the rotor including a rotor assembly, including a rotor shaft (4), an armature (5) and a commutator (6), both secured to the shaft (4);
   a drive pinion (15) rotatably supported on the shaft (4);
   connection means (14) for selectively coupling the shaft in the drive pinion;
   control means (16-21) for selectively engaging the connection means (14) and the shaft (4);
   bearings (23, 26) supported in respective bearing housing portions (10, 7) and journaling respective end portions (22,25) of the shaft; and means for controlling the longitudinal position and play of the shaft (4) in the bearings (23,26),
   comprising, in accordance with the invention,
   an axial play compensation adjustment plug (29), having an abutment surface (31) facing the outside of one of the bearing housings (7,10), and releasably fitted on the housing adjacent a bearing (23,26) and in axial alignment therewith;
   an engagement surface (32) formed on the bearing housing (7,10) and facing outwardly of the housing (7,10), and being engaged by the abutment surface (31) on the adjustment plug (29) with respect to the bearings; and
   an axial play compensation spacer (35, 35a, 35b) located between an end face (33) of the adjustment plug (29) and an end face (36) of the adjacent end portion (22, 25) of the shaft (4).

2. Starter according to claim 1 wherein (FIGS. 1, 2, 3) the bearings (23, 26) are retained in the starter housing;
   and wherein the axial play compensation adjustment plug (29) is located adjacent the bearing (26) at the commutator side of the starter.

3. Starter according to claim 1 wherein (FIG. 4) the bearings (23, 26) are retained in the stator housing;
   and wherein the axial play compensation adjustment plug (29) is located adjacent the bearing remote from the commutator.

4. Starter according to claim 1 wherein said axial play compensation adjustment plug (29) comprises a screw shank (34) having a head (30) larger than said shank and formed with a tool-engagement surface, said head being formed with said abutment surface (31) and tightly fitted against the adjacent engagement surface adjacent the respective bearing;
   and wherein said axial play compensation spacer (35) is interposed between the end face of the adjustment plug and the facing end of the adjacent end portion (22,25) of the shaft.

5. Starter according to claim 1 wherein the bearings are retained in the housing;
   and wherein the housing projects beyond the bearings by a distance of at least the thickness of the length (b) of the plug (29) plus the largest thickness of a compensation spacer adapted for installation in the starter.

6. Starter according to claim 1 wherein the axial play compensation spacer comprises a disc or washer (35).

7. Starter according to claim 1 wherein (FIG. 3) the axial play compensation spacer comprises a ring (35a).

8. Starter according to claim 1 wherein (FIG. 4) the axial play compensation spacer comprises a ball (35b).

9. Starter according to claim 8, wherein
the adjacent end faces (33,36) of the adjustment plug (29) and of the end portion (22,25) of shaft (4) are each formed with a depression to receive said ball (35b) and to retain said ball in axial alignment with the axis of rotation of the shaft (4).

10. Starter according to claim 5 wherein the axial play compensation spacer comprises a disc or washer (35).

11. Starter according to claim 5 wherein (FIG. 3) the axial play compensation spacer comprises a ring (35a).

12. Starter according to claim 5 wherein (FIG. 4) the axial play compensation spacer comprises a ball (35b).

13. Starter according to claim 12, wherein
the adjacent end faces (33,36) of the adjustment plug (29) and of the end portion (22,25) of shaft (4) are each formed with a depression to receive said ball (35b) and to retain said ball in axial alignment with the axis of rotation of the shaft (4).

* * * * *

UNITED STATES PATENT AND TRADEMARK OFFICE
CERTIFICATE OF CORRECTION

PATENT NO. : 4,506,162
DATED : March 19, 1985
INVENTOR(S) : BOLENZ et al

It is certified that error appears in the above-identified patent and that said Letters Patent is hereby corrected as shown below:

Column 4, line 36, "plug 23" should be -- plug 29 --
4, line 54, "surface 32" should read -- engagement surface 32 --

Signed and Sealed this

First Day of April 1986

[SEAL]

Attest:

*Attesting Officer*

DONALD J. QUIGG

*Commissioner of Patents and Trademarks*